United States Patent
Wright et al.

(10) Patent No.: US 9,516,809 B2
(45) Date of Patent: Dec. 13, 2016

(54) LAWN MOWER HAVING DECK LIFT SYSTEM WITH OVERBIASING SPRINGS

(71) Applicant: Wright Manufacturing, Inc., Frederick, MD (US)

(72) Inventors: Edward R. Wright, Frederick, MD (US); Corey M. Weems, Frederick, MD (US); Robert J. McCutcheon, IV, Germantown, MD (US)

(73) Assignee: Wright Manufacturing, Inc., Frederick, MD (US)

( * ) Notice: Subject to any disclaimer, the term of this patent is extended or adjusted under 35 U.S.C. 154(b) by 0 days.

(21) Appl. No.: 14/315,728

(22) Filed: Jun. 26, 2014

(65) Prior Publication Data
US 2015/0359173 A1    Dec. 17, 2015

Related U.S. Application Data

(60) Provisional application No. 62/011,752, filed on Jun. 13, 2014.

(51) Int. Cl.
*A01D 34/00* (2006.01)
*A01D 34/74* (2006.01)

(52) U.S. Cl.
CPC ..................... *A01D 34/74* (2013.01)

(58) Field of Classification Search
CPC .... A01D 34/74; A01D 2101/00; A01D 34/64; A01D 2034/645; A01D 34/661; Y10S 56/22
USPC .......................... 56/17.1, DIG. 22, 15.8, 14.9
See application file for complete search history.

(56) References Cited

U.S. PATENT DOCUMENTS

| | | | |
|---|---|---|---|
| 4,120,136 A * | 10/1978 | Rose | A01B 59/044 56/15.8 |
| 4,829,754 A * | 5/1989 | Shimamura | A01D 34/662 56/15.9 |
| 4,920,733 A | 5/1990 | Berrios | |
| 5,079,926 A | 1/1992 | Nicol | |
| 5,507,138 A | 4/1996 | Wright et al. | |
| 5,809,755 A | 9/1998 | Velke et al. | |
| 5,813,203 A | 9/1998 | Peter | |
| 5,816,033 A * | 10/1998 | Busboom | A01D 34/74 56/10.8 |
| 5,865,020 A | 2/1999 | Busboom et al. | |
| 5,913,802 A | 6/1999 | Mullet et al. | |
| 5,927,055 A * | 7/1999 | Ferree | A01D 34/662 56/15.9 |
| 5,964,082 A | 10/1999 | Wright et al. | |

(Continued)

OTHER PUBLICATIONS

U.S. Appl. No. 62/011,752, filed Jun. 16, 2014; Wright et al.

*Primary Examiner* — Árpád Fábián-Kovács
(74) *Attorney, Agent, or Firm* — Nixon & Vanderhye P.C.

(57) ABSTRACT

A deck lift system is adapted to permit at least the cutter deck to be raised and lowered relative to the ground so as to selectively adjust the mower's height of cut. The mower includes a deck lift system for raising and lowering the cutter deck assembly, an engine deck and the engine together as a unit. The deck lift system including at least a deck lift lever for selective operation by an operator of the mower and first and second biasing springs for at least helping raise the cutter deck assembly, engine deck, and engine. Biasing springs collectively provide sufficient biasing force so that operator of the mower has to physically push down on the deck lift lever in order to lower the cutter deck.

19 Claims, 13 Drawing Sheets

(56) References Cited

U.S. PATENT DOCUMENTS

| | | | |
|---|---|---|---|
| 6,138,446 A | 10/2000 | Velke et al. | |
| 6,189,304 B1 | 2/2001 | Velke et al. | |
| 6,205,753 B1 | 3/2001 | Velke et al. | |
| 6,347,502 B1 | 2/2002 | de Vries | |
| 6,390,225 B2 | 5/2002 | Velke et al. | |
| 6,438,930 B1 | 8/2002 | Velke et al. | |
| 6,438,931 B1 | 8/2002 | Velke et al. | |
| 6,494,028 B2* | 12/2002 | Moore | A01D 34/74 56/15.8 |
| 6,560,952 B2 | 5/2003 | Velke et al. | |
| 6,588,188 B2* | 7/2003 | Dennis | A01D 34/74 56/14.9 |
| 6,658,831 B2 | 12/2003 | Velke et al. | |
| 6,837,032 B1* | 1/2005 | Swartzendruber | A01D 34/64 56/14.9 |
| 6,868,658 B2* | 3/2005 | Velke | A01D 34/64 56/15.8 |
| 6,935,093 B2 | 8/2005 | Velke et al. | |
| 6,988,351 B2* | 1/2006 | Schick | A01D 34/662 56/15.9 |
| 7,213,662 B2* | 5/2007 | Crumly | A01D 34/6806 180/19.1 |
| 7,428,884 B2 | 9/2008 | Velke et al. | |
| 7,434,379 B2* | 10/2008 | Nogami | A01D 34/82 56/17.1 |
| 7,448,191 B2* | 11/2008 | Elhardt | A01D 34/74 56/17.1 |
| 7,520,114 B2* | 4/2009 | Bergsten | A01D 42/08 56/14.7 |
| 7,578,117 B2* | 8/2009 | Shaffer | A01D 34/74 56/17.1 |
| 7,712,294 B2 | 5/2010 | Wright et al. | |
| 2001/0001170 A1 | 5/2001 | Velke et al. | |
| 2002/0059788 A1 | 5/2002 | Velke et al. | |
| 2005/0126146 A1 | 6/2005 | Velke et al. | |
| 2007/0039304 A1* | 2/2007 | Wright | A01D 34/74 56/14.9 |
| 2009/0183481 A1* | 7/2009 | Lancaster | A01D 34/74 56/17.1 |
| 2012/0111655 A1* | 5/2012 | Ebihara | A01D 34/78 180/69.6 |
| 2014/0083069 A1* | 3/2014 | Berglund | A01D 34/82 56/14.7 |

* cited by examiner

LAWN MOWER HAVING DECK LIFT SYSTEM WITH OVERBIASING SPRINGS

This application claims priority on U.S. Provisional Application Ser. No. 62/011,752, filed Jun. 13, 2014, the entire disclosure of which is hereby incorporated herein by reference.

This invention relates to a lawn mower including a deck lift system. The deck lift system is adapted to permit at least the cutter deck to be raised and lowered relative to the ground so as to selectively adjust the mower's height of cut.

BACKGROUND AND SUMMARY OF THE INVENTION

Lawn mowers are known in the art. For example, stand-on mowers are discussed in U.S. Pat. Nos. 6,138,446, 6,390,225, 6,189,304, 6,438,930, 6,658,831, 6,560,952, 7,428,884 and 5,964,082, the disclosures of all of which are all hereby incorporated herein by reference. Example walk-behind lawn mowers are discussed in U.S. Patent Documents 2005/0126146 and 4,920,733, the disclosures of which are all hereby incorporated herein by reference. Example mower operable by seated occupants are discussed in U.S. Patent Documents 2001/0001170, 2002/0059788, U.S. Pat. Nos. 6,438,930, 6,658,831, and 6,560,952, the disclosures of which are all hereby incorporated herein by reference.

Traditionally mower deck lift systems sometimes include a handle or foot lever to raise or lower the cutter deck assembly. A selector or a stop pin are commonly used to control height of the cutter deck assembly and thus the height at which the mower cuts grass. There may also be a slackening connection in the deck lift system such as a chain or a slotted linkage for allowing the deck to float/raise over uneven contours in the ground. A bias, such as a spring, is commonly used to assist the operator in changing cut heights. However, providing too great of a spring bias has been thought to be undesirable in the art because it incurs problems where the deck will bounce upward when mowing over uneven ground thereby causing uneven grass cutting. Thus, those skilled in the art have conventionally avoided using too much spring bias in connection with deck lift systems.

Contrary to the longstanding belief in the art that too much spring force is undesirable in a deck lift system with a floating deck, example embodiments of this invention overspring/overbias the deck lift system. "Overspringing" and "overbiasing" the deck lift system, as used herein, means that the spring(s) provided in the deck lift system is/are capable of lifting more weight than the weight of what is lifted/lowered by the deck lift system in at least part of the range of movement of the deck lift system. Thus, the spring(s) in the deck lift system are capable of lifting more than 100% of the weight of what the deck lift system lifts (including the cutter deck) during at least part of the range of movement of the cutter deck. Example embodiments of the invention overcome the problem of the floating cutter deck bouncing upwardly too much during mower operations over uneven ground and thus causing uneven grass cutting by providing an incremental selector system that selectively and substantially locks the floating cutter deck against upward movement during mowing operations so as to restrain/reduce cutter deck bouncing. In example embodiments of this invention, the bias (spring(s)) is/are integrated into the incremental selector deck lift system so as to limit the bias applied to raising at least the cutter deck until a selector is disengaged. The spring(s) may be located in the deck lift system so as to work against linkage of the deck lift system, as opposed to working directly against the cutter deck. In certain example embodiments of this invention, when the selector is disengaged, an operator has to physically push down on the deck lift lever in order to lower the cutter deck in at least some of the movement range of the deck lift system (this may be the case throughout the entire range of movement in the cutter deck system; or in only part of the range of movement in the cutter deck system over which the cutter deck moves and in such cases in the remaining part of the range of movement in the cutter deck system the cutter deck lowers when the selector is disengaged without the operator having to physically push down on the deck lift lever). In certain example embodiments of this invention, when the selector is disengaged, an operator has to physically push down on the deck lift lever in order to lower the cutter deck in at least 10% of the cutter deck movement range of the deck lift system, more preferably in at least 20% of the cutter deck movement range of the deck lift system, even more preferably in at least 40% of the cutter deck movement range of the deck lift system, and sometimes in at least 50% of the cutter deck movement range of the deck lift system. The greater the overspringing amount is over 100% of what the deck lift system lifts, the greater the percentage of the deck lift system movement range where an operator has to physically push down on the deck lift lever in order to lower the cutter deck.

In certain example embodiments of this invention, the deck lift lever for lifting and lowering at least the cutter deck can be designed so as to communicate with one or more pivoting lift assemblies for the purpose of raising/lowering at least the cutter deck. The selector may be integral to the lever or separate from the lever. A technical advantage is that the bias can be increased significantly without incurring significant deck bounce even to the extent that the bias can be greater than force/weight of what is lifted and lowered by the deck lift system thereby allowing an operator of the mower to more easily raise and lower at least the cutter deck. This is particularly beneficial on large heavy commercial mowers and significantly less costly and more reliable than using solely electric or hydraulic power for raising and lowering the cutter deck. Advantages of this invention are applicable to mowers where the operator is standing on the mower or walking behind the mower where it's more problematic to use foot actuated deck lifts, but are also applicable to mowers where the operator is sitting on the mower during operation and moving the cutter deck with a hand lever or foot lever.

In certain example embodiments of this invention, the deck lift system is for selectively raising and lowering the cutter deck, engine deck, and engine as one unit. Thus, in such embodiments where the combination of the cutter deck assembly, engine deck assembly and engine are lifted/lowered together by the deck lift system, "overspringing" and "overbiasing" the deck lift system means that the spring(s) provided in the deck lift system is/are capable of lifting the combination of the cutter deck assembly, engine deck assembly and engine in at least part of the range of movement of the deck lift system.

In certain example embodiments of this invention, the mower includes: independently controlled right and left rear drive wheels (e.g., a zero turning radius mower); a cutter deck assembly including at least two grass cutting blades; a mower frame supporting at least the cutter deck assembly; at least one pivoting lift assembly linked to at least the cutter deck assembly to help raise and/or lower the cutter deck assembly; a slackening connection (e.g., one or more chains)

allowing at least the cutter deck assembly to float relative to the frame; a lever with an incremental selector either integral to the pivoting assembly or linked to the pivoting assembly; and at least one biasing member (e.g., spring) assisting the pivoting assembly in raising the cutter deck and for over-springing/overbiasing the deck lift system.

DETAILED DESCRIPTION OF EXAMPLE EMBODIMENTS OF THE INVENTION

Referring now more particularly to the accompanying drawings in which like reference numerals indicate like parts throughout the several views.

Figure 1:
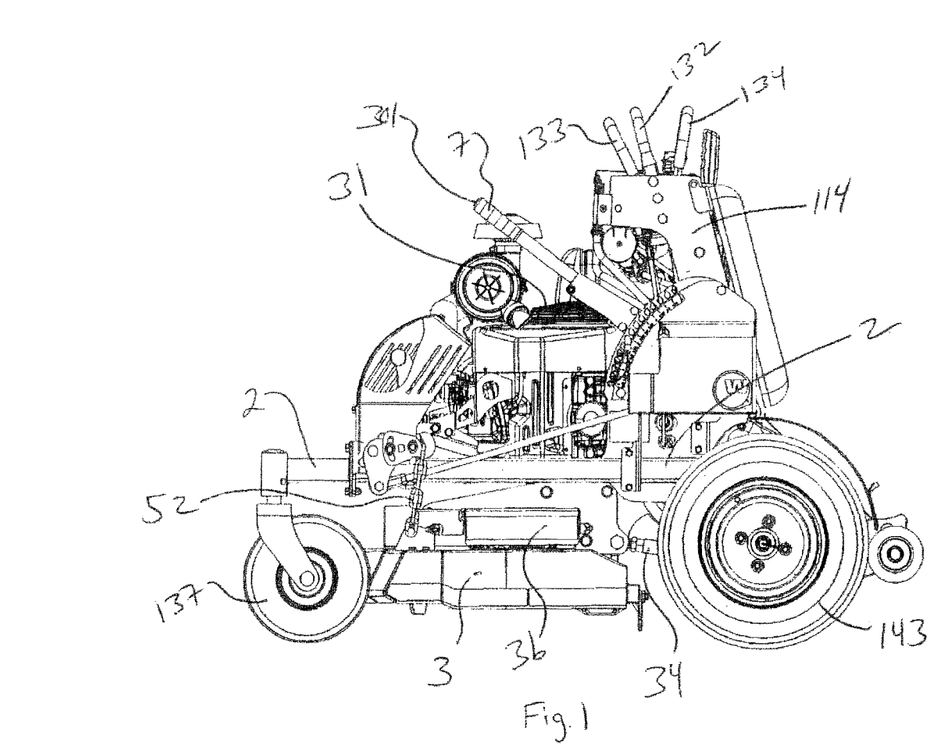
FIG. 1 is a side view of a stand-on mower according to an example embodiment of this invention.
Figure 2:
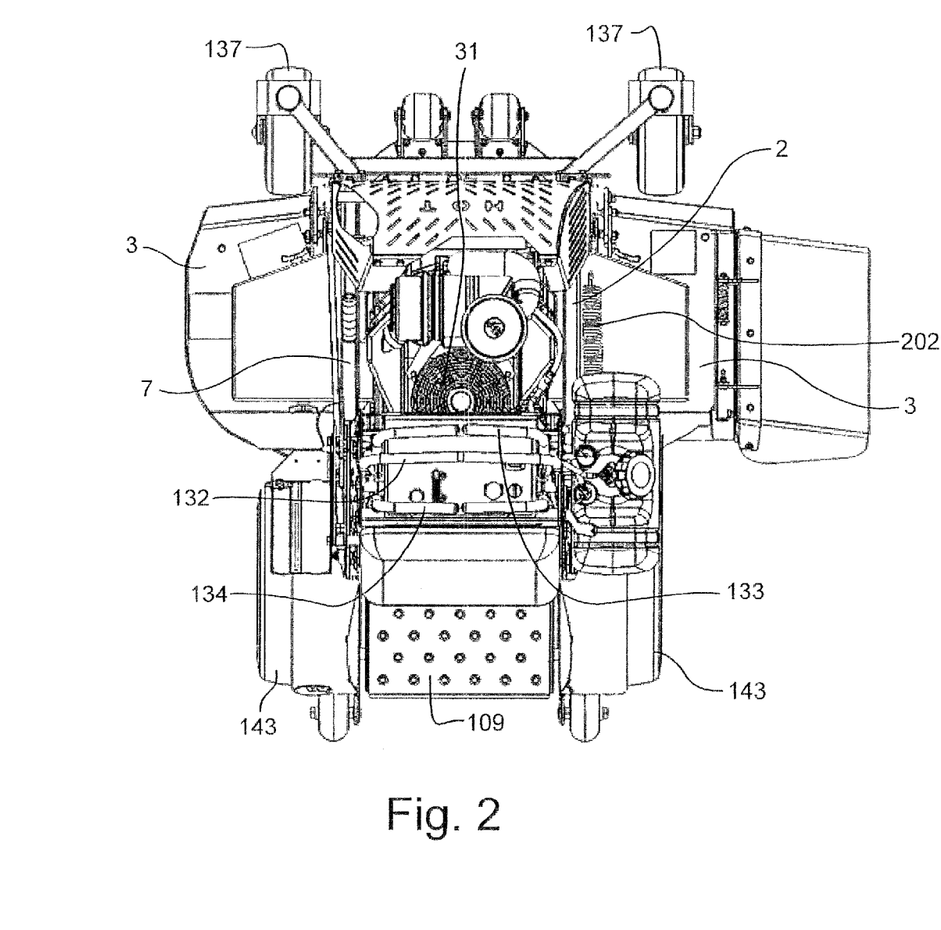
FIG. 2 is a top plan view of the mower of FIG. 1.
Figure 3:
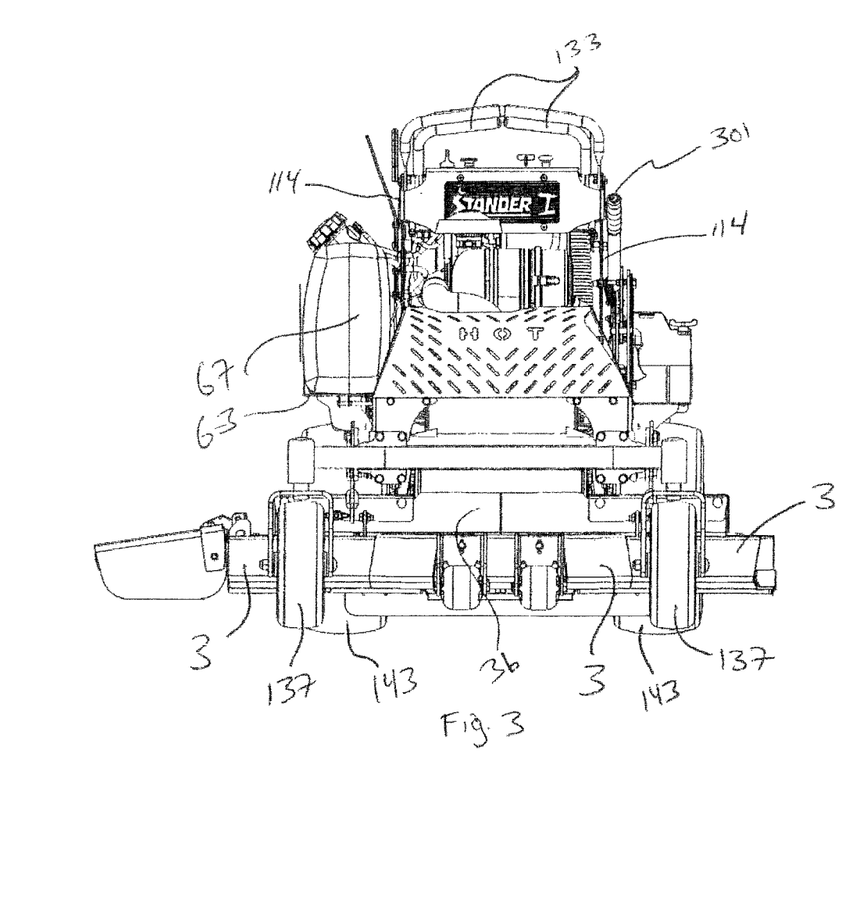
FIG. 3 is a front plan view of the mower of FIGS. 1-2.
Figure 4:
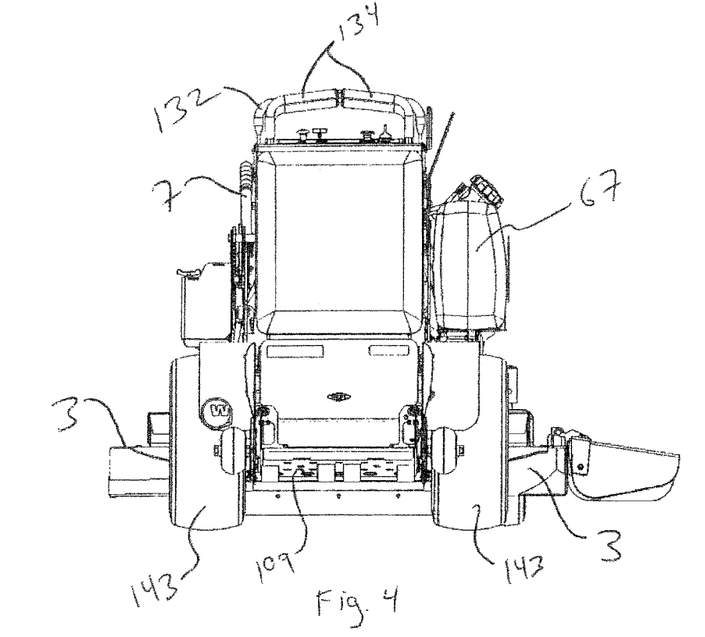
FIG. 4 is a rear plan view of the mower of FIGS. 1-3.
Figure 5:
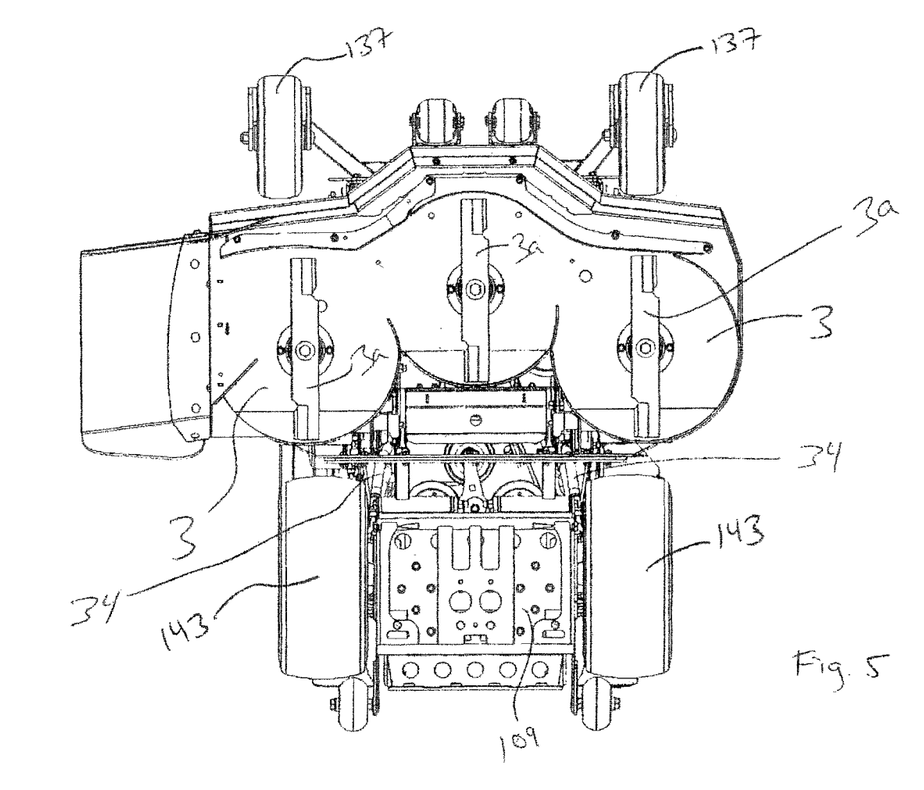
FIG. 5 is a bottom plan view of the mower of FIGS. 1-4.
Figure 6:
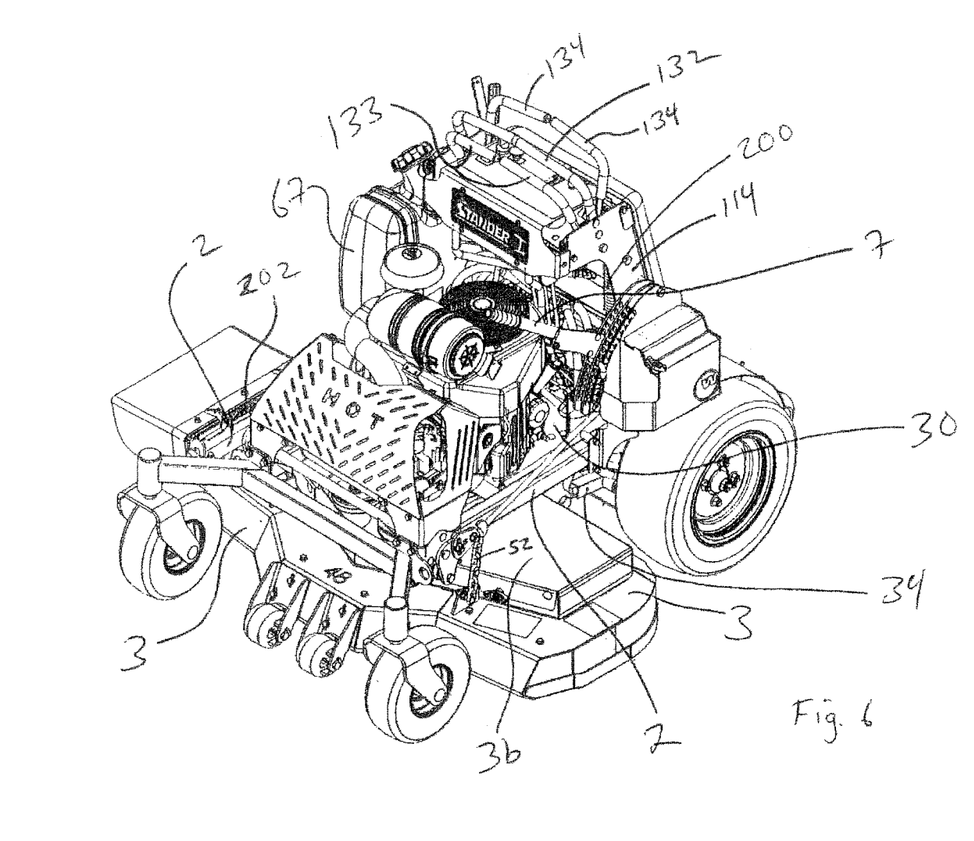
FIG. 6 is a perspective view from the top left of the mower of FIGS. 1-5.
Figure 7:
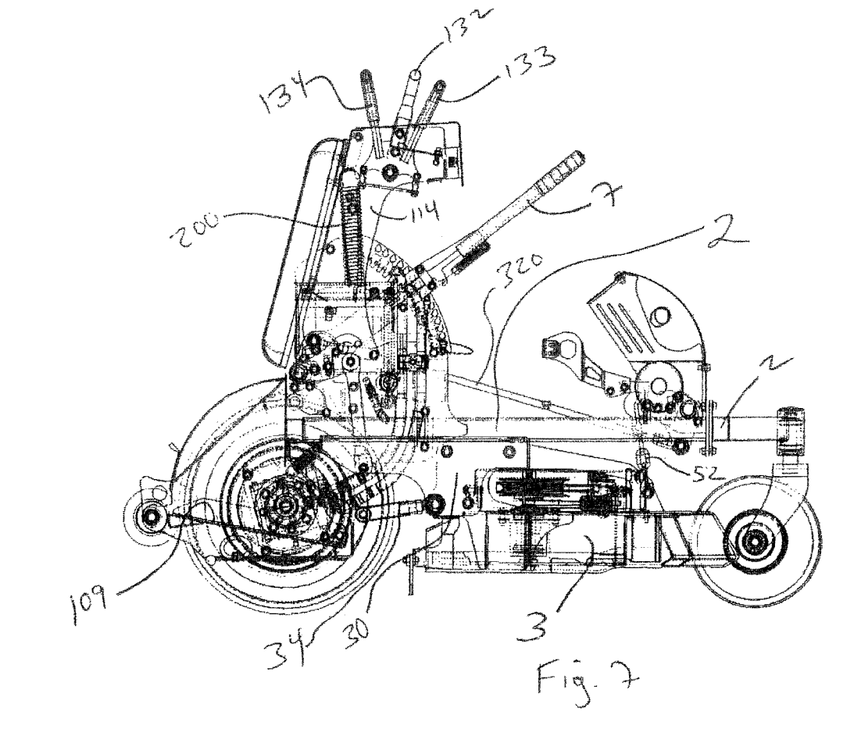
FIG. 7 is a cutaway view from the right of the mower of FIGS. 1-6.
Figure 8:
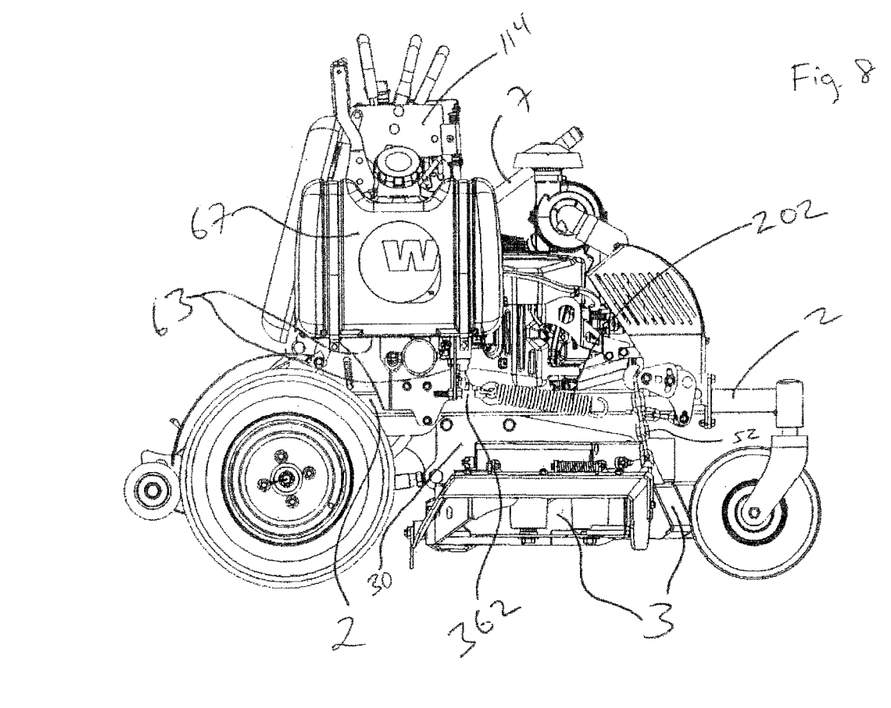
FIG. 8 is a right side plan view of the mower of FIGS. 1-7.
Figure 9:
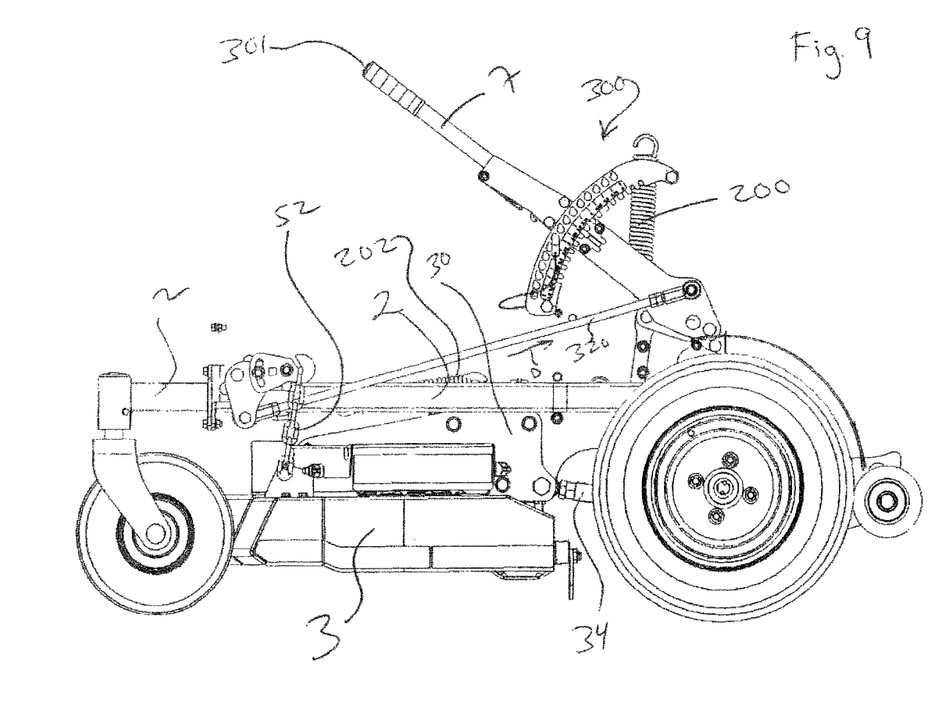
FIG. 9 is a left plan view illustrating certain features of the deck lift system of the mower of FIGS. 1-8.
Figure 10:
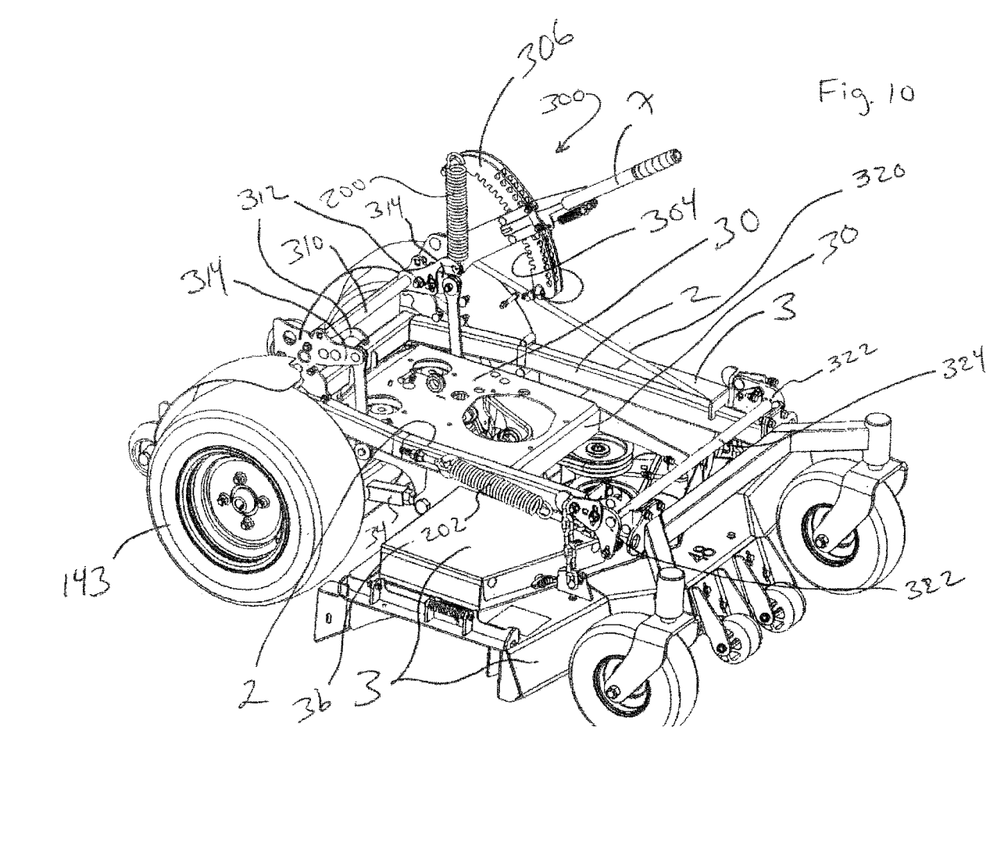
FIG. 10 is a top right perspective view of certain features of the deck lift system of the mower of FIGS. 1-9.
Figure 11:
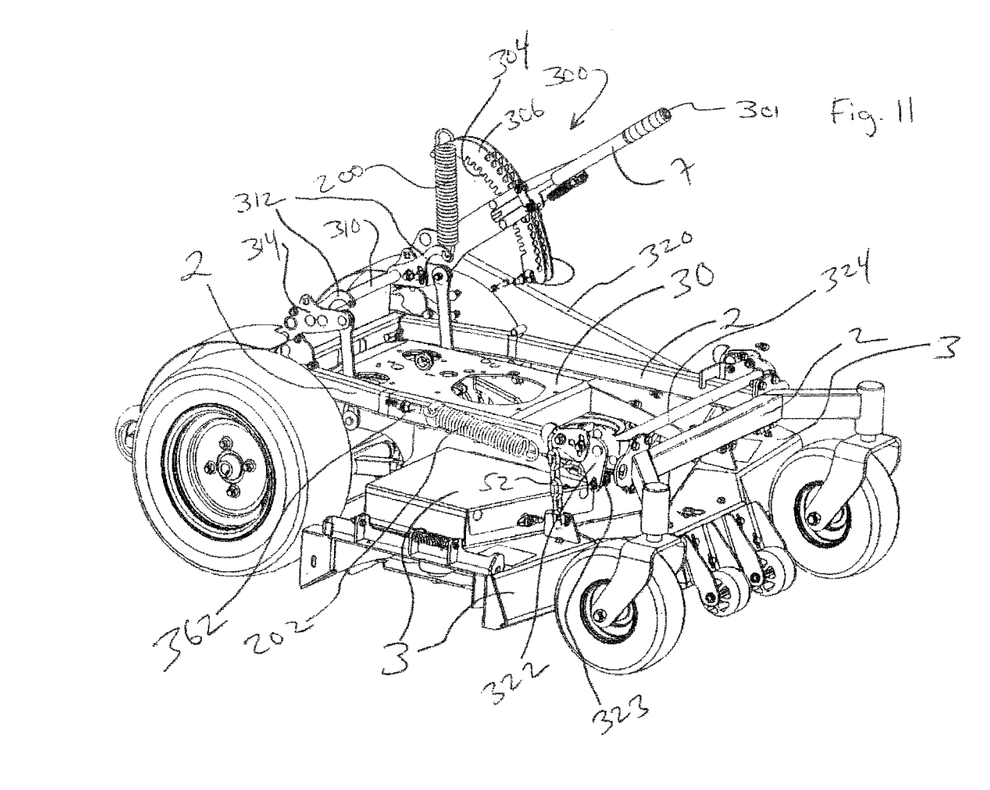
FIG. 11 is another top right perspective view of certain features of the deck lift system of the mower of FIGS. 1-10.
Figure 12:
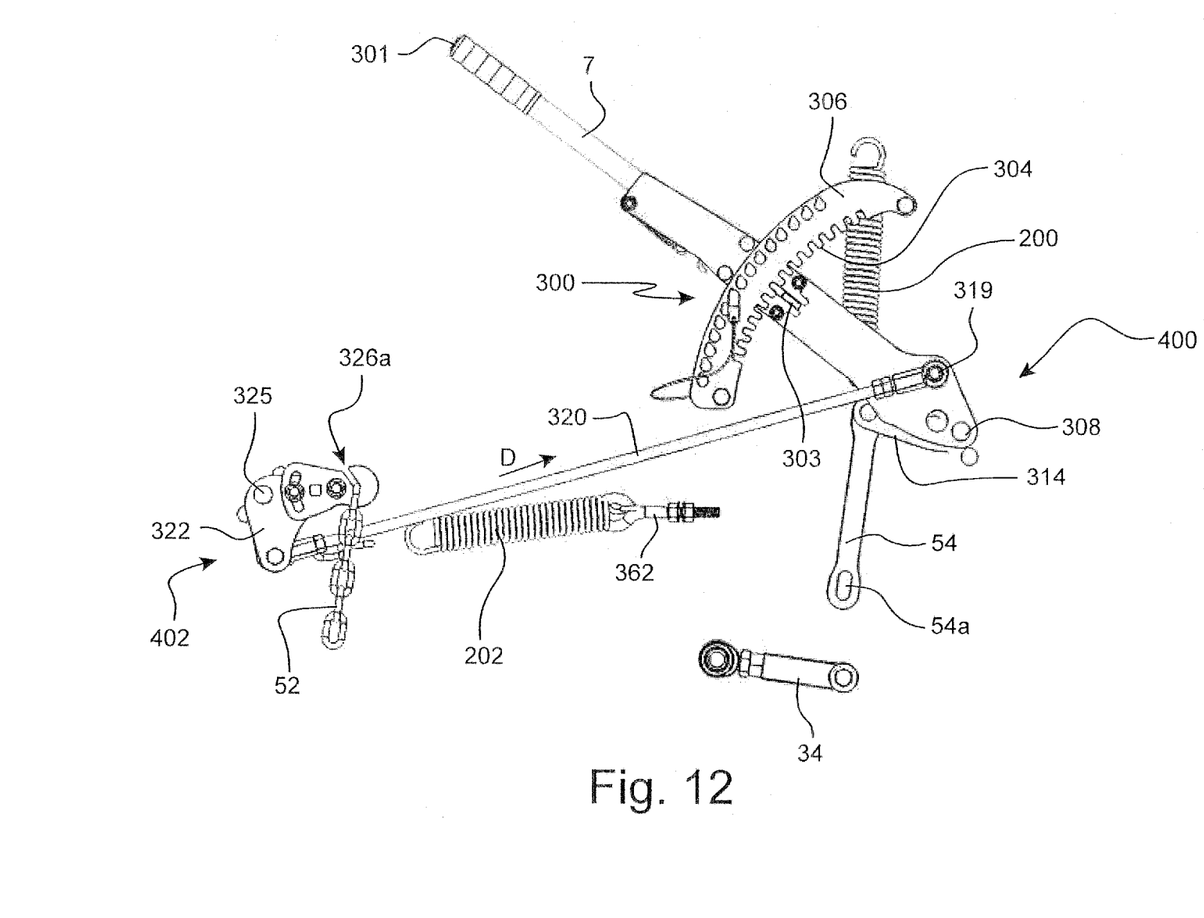
FIG. 12 is side plan view of certain features of the deck lift system of the mower of FIGS. 1-11.
Figure 13:
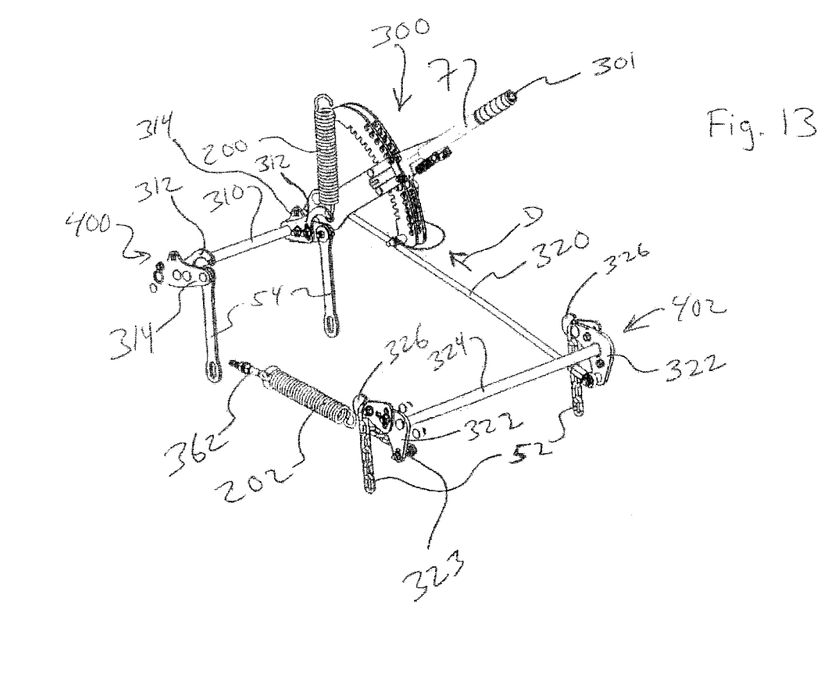
FIG. 13 is a top front left perspective view of certain features of the deck lift system of the mower of FIGS. 1-12.

In certain example embodiments of this invention, a lawn mower may be a stand-on mower, a sit-down mower, or a walk behind mower. The example mower illustrated in FIGS. 1-13 is a stand-on mower typically used for commercial grass cutting.

The mower of FIGS. 1-13 includes stationary or pivotable foot platform 109 on which the operator may stand during mower operation; frame 2 for suspending or supporting at least cutter deck 3; optional engine deck 30 which includes a plane upon which the engine 31 is mounted; a pair of laterally spaced side plates 114 extending upwardly from engine deck 30 or frame 2 in order to support (directly or indirectly) at least (1) normally stationary handlebar 132, (2) a pair of spaced apart pivotable front handle grips 133, and (3) a pair of spaced apart rear handle grips 134 (see U.S. Pat. No. 5,809,755, incorporated herein by reference); a pair of front casters or wheels 137 supported by the frame and/or the cutter deck assembly; combustion engine 31 mounted on the plane of engine deck 30; an engine shaft extending from the engine 31 downwardly through an aperture in the engine deck 30 for driving the cutter blades of the cutter deck assembly via belts and pulleys and pumps for the wheel drive system; an operator who may operate the mower when standing on platform 109; control arms 34, fuel tank stand 63 that supports at least a fuel tank 67, chains 52 and slotted linkage 54 (see slot 54a in FIG. 12) on each side of the mower from which the cutter deck 3 is suspended for allowing the cutter deck 3 to float over uneven contours in the ground, a pair of independently drivable rear drive wheels 143 which rotate about a common rear drive wheel axis and corresponding right and left hand hydrostatically controlled rear drive wheel motors whose wheel driving direction and speed are controlled by hydro pumps via pivoting handle controls 133 and/or 134 in a known manner as described in U.S. Pat. No. 5,809,755 which is incorporated herein by reference. The location, function, and structure of platform 109, hydro pumps, and wheel motors may be as shown and/or described in any of U.S. Pat. Nos. 5,765,357 or 5,809,755, both of which are hereby incorporated herein by reference. In this regard, the left rear drive wheel (one of 143) may be driven in a forward direction by one wheel motor while simultaneously the right rear drive wheel is driven in a rearward direction by the other wheel motor at approximately the same speed so that the mower conducts an approximate zero radius turn about a vertical zero radius turning axis that is spaced equal distance between the rear wheels 143 and extends upwardly through the common rear wheel axis. In alternative non-zero radius turning embodiments, both rear drive wheels 143 may be mounted on a single supporting axle.

In zero radius turning embodiments herein, at least a portion of foot platform 109 may be positioned so that the operator when standing on the platform is substantially uneffected by centrifugal force during zero radius turns of the mower. In certain embodiments, platform 109 may be positioned so that it is intersected by the zero radius turning axis. In other embodiments, platform 109 is positioned relative to handle grips 132-134 so that the operator when standing on platform 109 and gripping a portion of the handle control assembly is substantially uneffected by centrifugal force created during approximate zero radius turns of the mower and at least a portion of his or her body may be on or near (e.g., within six inches of) the vertical turning axis. In certain embodiments, handle grips 132-134 are located forward of the vertical turning axis and the platform on or rearward thereof so that the operator when standing on platform 109 is substantially uneffected by centrifugal force created during zero radius turns of the mower. In any of the above embodiments, at least a portion (or in some embodiments a substantial portion such as a thigh, head, torso, shoulder, chest, stomach, or the like) of the standing operator's body may be substantially at or near the vertical zero radius turning axis during mower operations such as turning, going up hills, or during flat terrain operation.

The deck lift system is more clearly illustrated in FIGS. 9-13. The deck lift system enables the cutter deck 3 to be raised and lowered selectively by the operator in order to adjust the cutting height of the mower. In certain embodiments, such as those illustrated herein, the engine deck 30 and engine 31 are raised/lowered along with the cutter deck 3 by the deck lift system. Deck heights are easily set as will be explained in more detail below. For example, when the selector is disengaged and when deck lift lever 7 is pulled upwardly/rearwardly by the operator (e.g., via a hand of the operator), the cutter deck assembly 3 together with the optional engine deck 30 and engine are raised so as increase the height of the mower cut. Contrary to the longstanding belief in the art that too much spring force is undesirable in a deck lift system with a floating deck, example embodiments of this invention overspring/overbias the deck lift system by the use of strongly biased asymmetrically located springs 200 and 202. "Overspringing" and "overbiasing" the deck lift system, as used herein, means that the spring(s) 200 and/or 202 provided in the deck lift system is/are capable of lifting more weight than the weight of what is lifted/lowered by the deck lift system in at least part of the range of movement of the deck lift system. Thus, in the example embodiment illustrated, the springs (e.g., 200 and 202, and possibly other spring(s)) together in the deck lift system are capable of lifting more than 100% of the weight of what the deck lift system lifts (the cutter deck assembly, engine deck assembly, and engine) during at least part of the range of movement of the cutter deck 3. In other example embodiments of this invention, springs of the deck lift system (e.g., springs 200, 202 and possibly other spring(s)) are capable of lifting more than 80% of the weight of what the deck lift system lifts (e.g., the cutter deck assembly, optional engine deck assembly, and engine) during at least part of the range of movement of the cutter deck 3. The "cutter deck assembly" includes the cutter deck 3 including its housing, cutting blades 3a, cover 3b, and the belts/pulleys under cover 3b. The "engine deck assembly" generally includes the engine deck 30 including its top surface and the side, front and rear surfaces thereof and things welded directly thereto. Example embodiments of the invention overcome the problem of the floating cutter deck 3 bouncing upwardly too much during mower operations over uneven ground and thus causing uneven grass cutting by providing an incremental selector system 300 that selectively and substantially locks the floating cutter deck 3 against upward movement during mowing operations so as to restrain/reduce cutter deck bouncing. The selector system 300 includes actuator button 301 at the end of deck lift lever 7, which is used to selectively engage a projection 303 in one of the gaps between teeth 304 in arc-shaped member 306. When an operator presses button 301 this causes the projection 303 to move away from the teeth 304 to the disengaged position shown in FIG. 12, so that the deck lift lever 7 can then pivot about axis 308 (also defined by rotatable bar 310 which is fixed to the lever 7 and moves therewith) and move relative to the arc-shaped member 306 and cause the cutter deck, engine deck and engine to move up/down. When the projection 303 is in the engaged position between two adjacent teeth 304 (i.e., when the button 301 is not being pressed by an operator), the selector system is locked so that the lever 7 cannot move relative to the arc-shaped member 306 and so that the floating cutter deck 3 is locked against upward movement during mower operation. In example embodiments of this invention, the bias springs 200 and 202 are integrated into the incremental selector deck lift system so as to limit the bias applied to raising at least the cutter deck 3 until selector projection 303 is disengaged from the teeth 304. The springs 200 and 202 are preferably located in the deck lift system, as shown in the figures, so as to work against linkage of the deck lift system as opposed to working directly against the cutter deck 3. In certain example embodiments of this invention, when the selector projection 303 is disengaged from teeth 304 so that the deck lift lever 7 can move/pivot, an operator has to physically push down on the deck lift lever 7 (i.e., counterclockwise in FIGS. 1 and 12) in order to lower the cutter deck 3 in at least some of the movement range of the deck lift system (this may be the case throughout the entire range of movement in the cutter deck system; or in only part of the range of movement in the cutter deck system over which the cutter deck moves and in such cases in the remaining part of the range of movement in the cutter deck system the cutter deck lowers when the selector is disengaged without the operator having to physically push down on the deck lift lever). In certain example embodiments of this invention, when the selector projection 303 is disengaged, an operator has to physically push down on the deck lift lever 7 in order to lower the cutter deck 3 in at least 10% of the cutter deck movement range of the deck lift system, more preferably in at least 20% of the cutter deck movement range of the deck lift system, even more preferably in at least 40% of the cutter deck movement range of the deck lift system, and sometimes in at least 50% of the cutter deck movement range of the deck lift system. The more the overspringing amount is over 100% of what the deck lift system lifts, the greater the percentage of the deck lift system movement range where an operator has to physically push down on the deck lift lever 7 in order to lower the cutter deck (i.e., the greater percentage of the movement range where the deck lift lever 7 does not pivot downward on its own when the projection 303 is disengaged).

The deck lift lever 7 for lifting and lowering at least the cutter deck 3 is designed so as to communicate with one or more pivoting lift assemblies 400, 402 for the purpose of raising/lowering at least the cutter deck 3. The selector may be integral to the lever or separate from the lever. A technical advantage is that the bias from the springs 200, 202 can be increased significantly without incurring significant deck bounce; even to the extent that the bias can be greater than force/weight of what is lifted and lowered by the deck lift system thereby allowing an operator of the mower to more easily raise and lower at least the cutter deck 3. This is particularly beneficial on large heavy commercial mowers and significantly less costly and more reliable than using solely electric or hydraulic power for raising and lowering the cutter deck. Advantages of this invention are applicable to mowers where the operator is standing on the mower or walking behind the mower where it's more problematic to use foot actuated deck lifts, but are also applicable to mowers where the operator is sitting on the mower during operation and moving the cutter deck with a hand lever or foot lever.

In certain example embodiments of this invention, the deck lift system is for selectively raising and lowering the cutter deck, engine deck, and engine as one unit. Thus, in such embodiments the combination of the cutter deck assembly, engine deck assembly and engine are lifted/lowered together by the deck lift system, and "overspringing" and "overbiasing" the deck lift system means that the spring(s) (e.g., see 200, 202) provided in the deck lift system is/are capable of lifting the combination of the cutter deck assembly, engine deck assembly and engine in at least part of the range of movement of the deck lift system.

Referring to the deck lift system, when an operator desires to raise the cutter deck 3, one presses button 301 in order to disengage projection 303 from teeth 304. Once the projection 303 is disengaged from teeth 304, the operator then pulls upward on the deck lift lever 7 to raise the cutter deck 3, engine deck 30 and engine as one unit. When the deck lift lever 7 is pulled upward (i.e., clockwise in FIG. 12), this causes bar 310, arms 312 and arms 314 to rotate therewith in the same direction about the same axis 308 which in turn causes the cutter deck 3 to be lifted via linkages 54. Slotted linkages 54 are provided between the cutter deck 3 and are arms 314, and are lifted upwardly when the deck lift lever 7 is pulled upwardly. Arms 312 and 314 are rigidly connected to the rotatable bar 310 which in turn is rigidly connected to the deck lift lever 7 so as to pivot/rotate therewith. Rear spring 200 is biased toward compression, with the top end of spring 200 being directly connected to the control frame (which is rigidly connected to the frame) and the bottom end of spring being directly connected to arm 312. Thus, spring 200 which is biased toward compression applies a biasing force to arm 312 (and thus to bar 310) biasing them to move in the same direction that they move when lever 7 is pulled upwardly by an operator (i.e., biasing toward and helping raising of the cutter deck). As explained above, because spring 200 is not connected directly to the cutter deck, engine deck, or engine, the spring 200 does not lift the decks when the actuator projection 303 is engaged with teeth 304 which restrains lifting of the decks.

When the deck lift lever 7 is pulled upward, this also causes link 320 (which is pivotally connected to the lever 7 at axis 319) to move in direction D which in turn causes arms 322 and rotatable bar 324 to rotate (in the opposite direction as bar 310 and arms 312, 314) about axis 325, which in turn causes the front part of the cutter deck 3 to be lifted via chains 52. Arms 322 are rigidly connected to bar 324 and move/pivot therewith. And arms 326 are rigidly connected to arms 322 and rotate therewith about the axis 325 defined by bar 324 so as to lift chains 52 and the decks. Arms 326 each have a notch 326*a* defined therewith which holds the upper end of a chain 52, and the bottom end of each chain 52 is connected (directly or indirectly) to the cutter deck 3. While rear spring 200 is oriented in a substantially vertical manner (vertical+/−fifteen degrees), front spring 202 is oriented in a substantially horizontal manner (horizontal+/−fifteen degrees) at least some of the time during mower operation. Front spring 202 is biased toward compression, with the rear end of spring 202 being directly connected to a downwardly extending portion of the fuel tank stand 63 via bolt 362 and a corresponding nut (the fuel tank stand is rigidly connected to the frame) and the front end of spring 202 being connected to the adjacent lift arm 322 via bolt 323. The front end of spring 202 may be directly connected to the bolt 323 extending from the lift arm 322, or alternatively there may be a chain provided between the bolt 323 and the front end of spring 202 so that the spring 202 and lift arm 322 are indirectly connected. Thus, spring 202 which is biased toward compression applies a biasing force to arm 322 (and thus to bar 324) biasing them to move/rotate/pivot in the same direction that they move/rotate/pivot when lever 7 is pulled upwardly by an operator (i.e., biasing toward and helping raising of the cutter deck). As explained above, because spring 202 is not connected directly to the cutter deck, engine deck, or engine, the spring 202 does not lift the decks when the actuator projection 303 is engaged with teeth 304 which restrains lifting of the decks.

While the inventions have been described in connection with what is presently considered to be the most practical and preferred embodiment, it is to be understood that the inventions are not to be limited to the disclosed embodiments, but on the contrary, are intended to cover various modifications and equivalent arrangements included within the spirit and scope of the appended claims.

The invention claimed is:

1. A lawn mower comprising:
   a cutter deck assembly including a cutter deck and a plurality of cutting blades that are driven by at least an engine for cutting grass;
   a deck lift system for raising and lowering the cutter deck assembly, an engine deck and the engine together as a unit so that a height of cut of the mower can be adjusted by an operator of the lawn mower, the deck lift system including at least a deck lift hand lever for selective operation by an operator of the mower and first and second biasing springs for providing biasing force for at least helping raise the cutter deck assembly, engine deck, and engine;
   wherein the cutter deck assembly is suspended from a frame of the mower so that the cutter deck assembly can float relative to the frame; and
   wherein the first and second biasing springs collectively provide sufficient biasing force so that operator of the mower has to physically push down on the deck lift hand lever in order to lower the cutter deck in at least 10% of a cutter deck movement range of the deck lift system, said pushing down on the deck lift hand lever by the operator causing the cutter deck to be lowered.

2. The mower of claim 1, wherein the first and second biasing springs collectively provide sufficient biasing force so that operator of the mower has to physically push down on the deck lift lever in order to lower the cutter deck in at least 20% of the cutter deck movement range of the deck lift system.

3. The mower of claim 1, wherein the first and second biasing springs collectively provide sufficient biasing force so that operator of the mower has to physically push down on the deck lift lever in order to lower the cutter deck in at least 40% of the cutter deck movement range of the deck lift system.

4. The mower of claim 1, wherein the first and second biasing springs collectively provide sufficient biasing force so that operator of the mower has to physically push down on the deck lift lever in order to lower the cutter deck in at least 50% of the cutter deck movement range of the deck lift system.

5. The mower of claim 1, wherein the deck lift system comprises an incremental selector system for selectively and substantially locking the floating cutter deck against upward movement during mowing operations so as to restrain/reduce cutter deck bouncing during mower operations.

6. The mower of claim 5, wherein in the deck lift system the selector system limits the bias applied by the springs for raising at least the cutter deck until a selector of the selector system is disengaged.

7. The mower of claim 1, wherein the cutter deck assembly is suspended from the frame via at least first and second chains.

8. The mower of claim 1, wherein the cutter deck assembly is suspended from the frame via at least first and second chains and via at least first and second slotted members so as to allow the cutter deck to float relative to the frame.

9. The mower of claim 1, wherein the first spring is substantially vertically aligned during mowing operations and the second spring is substantially horizontally aligned during mowing operations.

10. The mower of claim 1, wherein the first and second springs are asymmetrically oriented relative to one another.

11. The mower of claim 1, wherein the second spring is entirely located closer to a front edge of the mower than is an entirety of the first spring.

12. The mower of claim 11, wherein the first and second springs are located on opposite sides of the mower relative to a line drawn down a centerline of the mower from front to back of the mower.

13. The mower of claim 1, wherein the first and second springs overspring the deck lift system so that biasing force provided to the deck lift system by the springs is sufficient for lifting more weight than the weight of the combination of the cutter deck assembly, engine deck and engine in at least part of the range of movement of the deck lift system.

14. A lawn mower comprising:
   a cutter deck assembly including a cutter deck and a plurality of cutting blades that are driven by at least an engine for cutting grass;
   a deck lift system for raising and lowering at least the cutter deck assembly so that a height of cut of the mower can be adjusted by an operator of the lawn mower, the deck lift system including at least a deck lift hand lever for selective operation by an operator of the mower and first and second biasing springs for providing biasing force for at least helping raise the cutter deck assembly, wherein the cutter deck raises when the operator pulls upwardly on the deck lift hand lever;

wherein the cutter deck assembly is suspended from a frame of the mower so that the cutter deck assembly can float relative to the frame;

an incremental selector system for selectively and substantially locking the floating cutter deck against upward movement during mowing operations so as to restrain/reduce cutter deck bouncing during mower operations, wherein the selector system limits the bias applied by the springs for raising at least the cutter deck until a selector of the selector system is disengaged; and wherein the first spring is substantially vertically aligned during mowing operations and the second spring is substantially horizontally aligned during mowing operations.

15. The mower of claim 14, wherein the first and second biasing springs collectively provide sufficient biasing force so that operator of the mower has to physically push down on the deck lift lever in order to lower the cutter deck in at least 10% of a cutter deck movement range of the deck lift system, said pushing down on the deck lift lever by the operator causing the cutter deck to be lowered.

16. The mower of claim 14, wherein the first and second biasing springs collectively provide sufficient biasing force so that operator of the mower has to physically push down on the deck lift lever in order to lower the cutter deck in at least 20% of the cutter deck movement range of the deck lift system.

17. The mower of claim 14, wherein the first and second biasing springs collectively provide sufficient biasing force so that operator of the mower has to physically push down on the deck lift lever in order to lower the cutter deck in at least 40% of the cutter deck movement range of the deck lift system.

18. The mower of claim 14, wherein the mower further comprises an engine deck, and wherein the deck lift system raises and lowers the cutter deck assembly, the engine deck, and the engine together as a unit.

19. The mower of claim 14, wherein the cutter deck assembly is suspended from the frame via at least first and second chains.

* * * * *